2 Sheets—Sheet 1.

C. M. CURTIS.

Assignor by mesne assignments to M. M. Johnston.

DENTAL-ENGINE.

No. 7,670. Reissued May 8, 1877.

Attest:
Ezra Patrick
John L. Boudrou

Inventor:
M. M. Johnston, assignee
of Chas. M. Curtis by
Pollok & Bailey
attys

2 Sheets—Sheet 2.
C. M. CURTIS.
Assignor by mesne assignments to M. M. Johnston.
DENTAL-ENGINE.
No. 7,670. Reissued May 8, 1877.
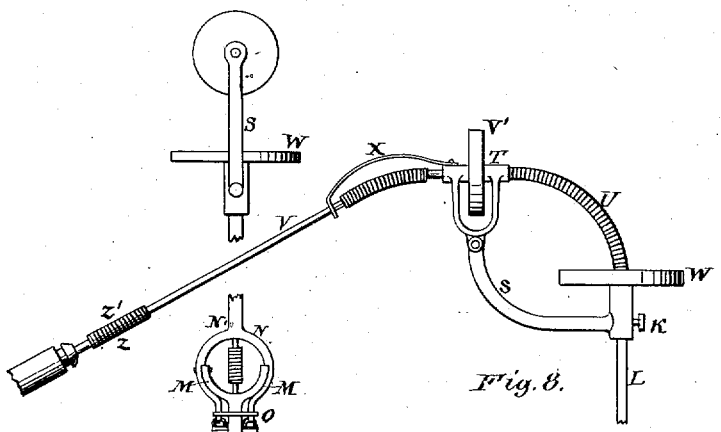
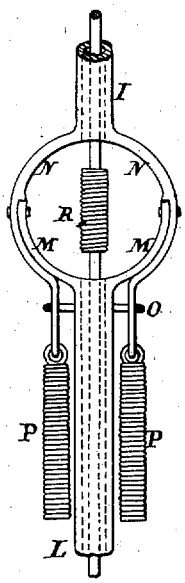
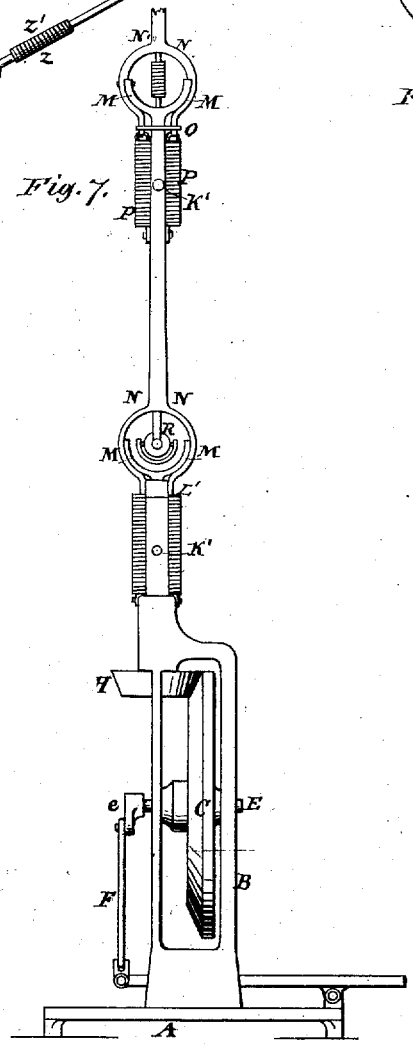
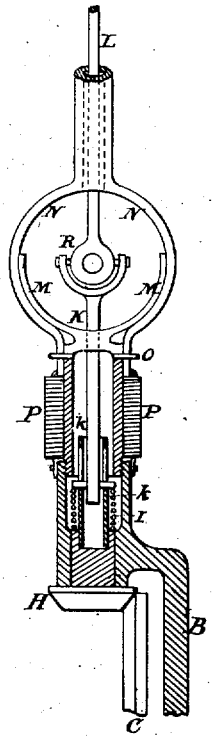
Attest:
Evelle a Brick
John L. Boudroe
Inventor:
M. M. Johnston, assignee
of Chas. M. Curtis by
Pollok & Dailey Attys

UNITED STATES PATENT OFFICE.

CHARLES M. CURTIS, OF PHILADELPHIA, PENNSYLVANIA, ASSIGNOR, BY MESNE ASSIGNMENTS, TO MELVILLE M. JOHNSTON, OF NEW YORK CITY.

IMPROVEMENT IN DENTAL ENGINES.

Specification forming part of Letters Patent No. 138,318, dated April 29, 1873; reissue No. 7,670, dated May 8, 1877; application filed April 23, 1877.

*To all whom it may concern:*

Be it known that I, CHARLES M. CURTIS, of Philadelphia, in the county of Philadelphia and State of Pennsylvania, have invented certain new and useful Improvements in Dental Engines, and in hand-pieces therefor; and I do hereby declare the following to be a full, clear, and exact description of the invention, such as will enable others skilled in the art to which it pertains to make and use it, reference being had to the accompanying drawings, which form part of this specification.

Figure 1:
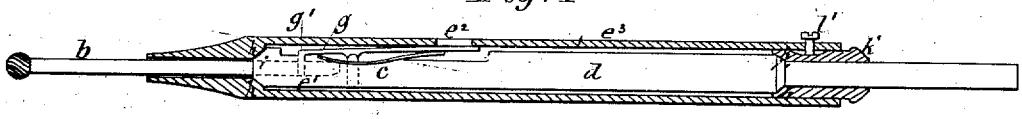
Figure 2:
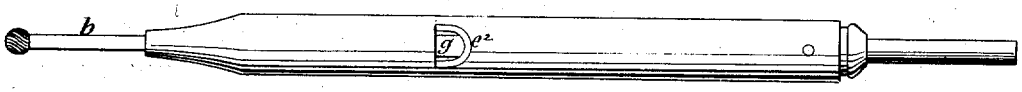
Figure 3:
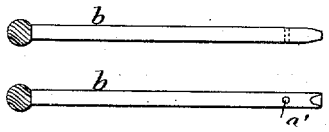
Figure 4:
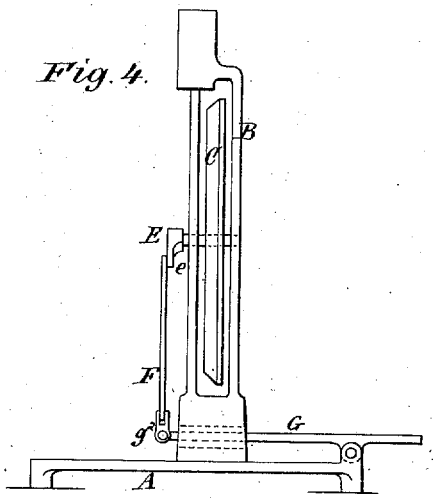
Figure 5:
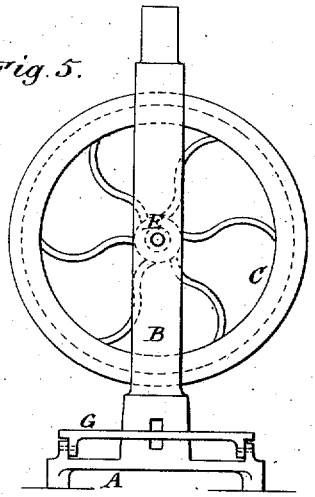
Figure 6:
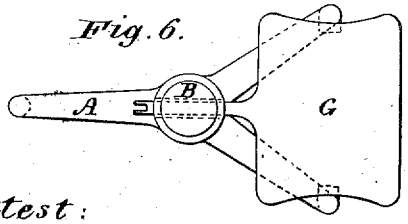

Referring to the accompanying drawings, Figure 1 is a longitudinal central sectional view of the hand-piece. Fig. 2 is a side view of the hand-piece. Fig. 3 are side views of the tool. Fig. 4 is a side elevation of the base of a dental engine. Fig. 5 is a front view of the same. Fig. 6 is a plan view of the treadle-tripod. Fig. 7 is a side elevation of the engine complete. Fig. 8 is a side view of the upper portion of the flexible rod or shaft. Fig. 9 is a sectional view of the lower portion of the flexible rod or shaft.

My invention relates to an improved form of dental burring-engine, especially designed to assist in operations upon the natural teeth in the mouth.

The nature of this invention may be briefly stated as consisting in the peculiar construction of a continuously-rotating rod or shaft, and its supports and attachments, communicating motion from a fly-wheel operated by the foot or other power to the tool, by which a great degree of flexure and mobility is obtained without undue friction, noise, or loss of power, dispensing with all cords, bands, and pulleys, and securing a steady continuous motion.

My invention also relates to the hand-piece, which contains the tool-carrying spindle, or that part of the rotary shaft which carries the tool. Its object here is to provide means whereby the shaft may be caused to always run true and even in its bearings in the hand-piece, and whereby all looseness of bearing caused by wear can be readily taken up; further, to provide a tool-locking mechanism, which is contained within the case of the hand-piece, and is attached to and revolves with the tool-carrying shaft, and which, furthermore, is arranged and adapted to be operated through an aperture in the case, in order to unlock the tool.

The accompanying drawing represents these improvements.

A designates a tripod or stand, from which rises a suitably shaped and arranged standard, B, to which it is secured. C is a beveled fly-wheel, fixed to the shaft E, which passes through bearings in the standard B. This shaft is provided with a crank, *e*, which receives the double-jointed pitman-rod F, connected with the treadle G at $a^2$. The treadle is hinged to the tripod or stand, and is in line with the axis of the fly-wheel. Immediately over the fly-wheel, and engaging with its upper beveled edge, and secured in a bearing attached to the standard B, is a beveled friction wheel or roller, H, of solid rubber, bushed with brass, pressed down to the fly-wheel by the spring I. To this friction-wheel the continuous rotating rod or shaft K is secured and keyed in a slotted sleeve-coupling, *k*, causing them to rotate together, and yet allowing the shaft to slide up and down freely to accommodate the change in its length in position during flexure. L designates a tubular staff or standard, supporting and protecting the shaft K. It is connected to the standard B by a rotating or sleeve joint provided with a set-screw, K′, so as to allow or prevent motion, at the will of the operator. Above this, at convenient distances, are arranged one or more hinged joints of peculiar construction, attached to staff L by rotating sleeve-joints provided with set-screws, as at K′. This joint is formed by two diverging branches, M M, firmly attached to the staff L, or to a collar, L′, closely fitting either inside or outside of the staff L, allowing it to rotate freely. The upper part of the joint is formed of two similar branches, N, of the upper section, with holes for pivots to pass through, and extending downward a suitable distance below them to afford sufficient leverage for the springs or rubber rings designed to keep the staff in an upright position when not in use.

The two ends are connected by an elongated ring, O, embracing the staff, the object of this ring being to limit the amount of flexure, guard against accident in case the springs or rubber rings should be injured, and also to serve for the attachment of the springs or rubber rings P, which extend from the ring on either side of the staff, said springs or rubber rings being of equal strength, and so arranged as not to be affected by the rotation of the staff; or these springs or rings might be attached directly to the branches N, and fastened, as shown, to the staff or sections. At each end of each section or length of the staff L, or at any convenient point between the two extreme ends, are arranged suitable bearings for the rod or shaft K, and at each joint the ends of the sections are connected by a universal or link joint.

The several hinge-joints are properly balanced by springs of elastic rubber rings or other device, so as to bend with each other, giving the engine great latitude of motion, without interfering in the least with the rotation of the inclosed shaft, and at the same time giving it sufficient firmness for the purpose required. Near the top of the shaft, and attached to it by a collar, so as to allow it to freely rotate around the staff L, is a short arm, S, curved upward, and carrying in suitable bearings a short shaft, T. This shaft is designed to change the direction of the shaft K from a vertical to a horizontal position, and is connected with the vertical portion by a well-tempered spiral spring, U. The other end is also fitted with a short length of spiral spring, to which is attached a steel rod, V, which transmits motion to the hand-piece. Attached to the arm S, over the spring uniting the shaft T to the rod V, is pivoted an elastic flat spring, X, through the free end of which the rod V passes. The object of this spring is to steady the rod, and prevent the vibration that would otherwise take place. This it does without interfering with its freedom of motion, and having the great advantage over a rigid arm, that there is no danger by actual torsion to bend or throw it out of shape, for, being very sensitive to the slightest motion, it leads itself to any position or direction that is necessary for it to assume. It also guards the apparatus from injury if the hand-piece be allowed to fall suddenly, as may often happen in actual practice. At the top of the staff, immediately above the arm S, is arranged a small stone, W, revolving with the shaft, designed for sharpening instruments, &c., and between the bearings of the shaft T a small grindstone, V′, may be suitably secured.

My improvements in the hand-piece are illustrated clearly in Figs. 1, 2, and 3.

The case of the hand-piece is marked $e^3$. Within it is supported the tool-carrying spindle *d*, that is designed to be connected with and rotated by the rotary shaft, as in ordinary dental engines. The spindle has its bearings in the case. These bearings, with which the case is provided, are marked *h*. They are conical, one being at or near the front, and the other being at or near the rear of the case. They are also reversed—that is to say, they have their bases opposite one another—the front bearing tapering toward the front, and the rear bearing tapering toward the rear. On the tool-carrying spindle *d* are formed correspondingly conical journals *i i′*, which rest in the bearings, as shown. By these journals and bearings the spindle is supported and guided, maintained at all times true, and caused to revolve evenly and smoothly. In order to take up wear, one of the bearings is made adjustable, being formed for the purpose on the inner end of a sleeve or tube, *k′*, which fits within the case, and encircles the spindle, and is detachably connected and held to the case, so that it may be moved whenever it becomes necessary to take up wear. The connection is effected by means of a set or binding screw, *l′*, which passes through the case, and bears on a flattened face formed on the periphery of the sleeve lengthwise thereof. The sleeve is also removable, to permit the withdrawal of the spindle from the case, if this should at any time become necessary.

As a means of securing the tool to the spindle, I provide a locking mechanism, which is contained within the case of the hand-piece, and is mounted on and revolves with the spindle. The locking mechanism which I thus employ interlocks with the tool, so as to prevent it from either revolving or moving longitudinally independently of the spindle by which it is carried. These features are shown in the drawing. The spindle *d*, at its front end, is provided with a socket to receive the shank of a tool, *b*. At right angles with the socket an aperture or hole is formed in the spindle, which hole opens into the socket. In this hole is located a locking pin or stud, $g^1$, which is mounted on one end of a lever, *g*, of the first order, which is pivoted to the spindle, and arranged in a recess on the exterior thereof. The lever is, by means of a spring, *c*, normally held in such position that the end of the locking-pin projects some distance into the socket. The tool *b* has its end beveled, so that when the same is inserted in the socket it may pass under and gradually lift the locking-pin. This continues until the tool has been so far inserted in the socket that a hole, *a′*, in its shank comes under the pin. The latter then drops into the hole, and the tool is thus locked securely in place. To prevent torsional strain on the pin, the tool-socket may terminate in a bevel fitting around the beveled or flattened end of the tool, thus relieving the pin of the strain referred to.

To operate the locking mechanism so as to release the tool, I form in the case an opening, $e^2$, through which the locking-lever may be manipulated to raise the pin, and so disengage it from the tool. The mechanism here employed for securing the tool in place is one that, as soon as it once engages with the tool, prevents the latter from either longitudinal or rotary movement independently of the tool-carrying spindle, and it must be manipulated before the tool can be released and removed. In this it differs from those methods of holding the tool where the tool-shank is simply jammed in a socket and there secured by a set-screw, or where the tool can be unlocked or disengaged by partially rotating it, and is free to be so moved. On the contrary, in the present case, the tool can have no independent movement, either rotary or otherwise, until the interlocking mechanism is first manipulated to disengage it from the tool, and to leave the latter free to be removed from the socket. This mechanism, possessing the characteristics specified, is here termed "interlocking" mechanism to distinguish it from the other methods above referred to of securing the tool. It is manifest that when such a mechanism is mounted on the spindle within the case or sleeve of the hand-piece, it is indispensable that there should be an opening or aperture in said case or sleeve, through which the mechanism can be reached; otherwise the tool, when once locked in place, could not be released without removing the spindle from the case.

The advantages of the above-described improvements may be stated as follows:

The foot-plate of the treadle and pitman being on different sides of the standard which gives bearings to the fly-wheel, the operator's leg is not liable to come in contact with said pitman—an annoyance experienced with a different construction. The arrangement of the shaft K with its sleeve-coupling permits free rotation with the beveled wheel H, the spring I keeping said beveled wheel pressed well against the driving-wheel, while the key and slot in said coupling permit the shaft to slide up and down, to accommodate itself to the flexure at its joints. The means illustrated for changing the direction of the shaft from a vertical to a horizontal position—namely, the arm S, spring U, and short shaft T—possess great advantages. Were the spring alone employed, the changes could, of course, be effected; but the shaft would lack the steadiness which my arrangement secures. This arrangement also affords, as described, a bearing for a grindstone, which will often be found a very great convenience, and it enables me to effect the swiveled arrangement, as described, whereby the outer extremity of the arm may be turned easily around on the main shaft to any desired position, and keyed securely in place. The flat metal spring permits the horizontal portion or arm of the shaft to be easily raised or depressed, while it counteracts the tendency of the shaft to lateral vibration. The improved construction and arrangement of the parts of the hand-piece will also be found highly advantageous.

It is, of course, obvious that cogged wheels may be substituted for the friction driving-wheel and pinion. I prefer, however, to employ the friction-wheels, as they work admirably, and are less noisy than cog-wheels; and, though the universal joint is more costly than the spring-connection, and cannot be well employed where great flexure is necessary, still I prefer to use said universal joint, as the flexure necessary at the points indicated is but slight, and this form of joint, under such circumstances, does not bind as the spring does.

I have described means, including a spring or springs, for raising and holding the shaft in an upright position; but I do not claim, broadly, the employment of a spring for such purpose.

What I claim as my invention, and desire to secure by Letters Patent, is—

1. The arrangement of the treadle-plate and pitman on opposite sides of the standard, said pitman and plate being connected by an arm of the latter intersecting the standard, substantially as described.

2. The combination of the wheel H, bearing B, shaft K, and spring I, substantially as set forth.

3. The combination of the shaft K and slotted sleeve-coupling $k$ and $k'$, as shown and described.

4. The combination of the coupling M N with the staff L, or the extensions thereof, the branches being attached to said staff L, or to a collar or sleeve, by suitable springs P P, as set forth.

5. In combination with the shaft K, the curved arm S, bent spring U, and short shaft T, as set forth.

6. The flat spring X, in combination with arm S and rod V.

7. In a hand-piece for dental engines, the combination, substantially as set forth, of a case provided with reversed conical bearings, and a tool-carrying spindle, held within the case, and provided with corresponding conical journals, which are received and supported in said bearings.

8. The combination, in a hand-piece for dental engines, of a tool-carrying spindle, provided with reversed conical journals, and a surrounding case provided with corresponding conical bearings, one of which is adjustable to take up wear, substantially as set forth.

9. In a hand-piece for dental engines, the combination of a tool-carrying spindle, provided with reversed conical journals, a surrounding case provided with a front conical bearing to receive the front conical journal of the spindle, and a rear bearing-sleeve, encircling the spindle, adjustably and detachably connected with the case, and provided at its inner end with a conical bearing to receive the rear conical journal of the spindle, substantially as set forth.

10. The combination, in a hand-piece for dental engines, of a rotary tool-carrying spindle, a positive tool-interlocking mechanism, carried by, and revolving with, the spindle, preventing longitudinal and rotary movement of the tool independently of the spindle, and a surrounding case, which contains and supports the spindle, and is formed with an aperture or opening, through which the interlocking mechanism can be manipulated to release the tool, substantially as set forth.

In testimony that I claim the foregoing I have hereunto set my hand this 9th day of February, 1877.

CHAS. M. CURTIS.

Witnesses:
WM. A. THORP,
ROBT. GIBSON.